Patented Sept. 15, 1953

2,652,357

UNITED STATES PATENT OFFICE 2,652,357

SELECTIVE EXTRACTION OF SUBSTANCES POSSESSING ANTIPERNICIOUS ANEMIA ACTIVITY WITH DIETHYLACETIC ACID

Jared H. Ford and William G. Jackson, Kalamazoo, Mich., assignors to The Upjohn Company, Kalamazoo, Mich., a corporation of Michigan No Drawing. Application August 3, 1950, Serial No. 177,566

3 Claims. (Cl. 167—81)

This invention relates to a method for the selective partition or extraction, purification and concentration of vitamins $B_{12}$, $B_{12b}$ and other anti-pernicious anemia factors from genetic impurities associated therewith. The process of the present invention is based upon the discovery that there is an unusually favorable distribution of anti-pernicious anemia factors between a two phase system consisting of water and diethylacetic acid.

The presence of anti-pernicious anemia factors in various animal organs, particularly in liver, is well-established. So-called "liver concentrates," which contain such factors, have wide usage in the treatment of pernicious (Addisonian) and macrocytic anemias of the pernicious anemia type with a megaloblastic bone marrow. The anti-pernicious anemia fraction of liver has been highly concentrated [Biochem. J., (Proceedings) 40, iv: (1946); Nature, 161, 638: (1948); and Science, 107, 396: (1948)] and at present two anti-pernicious anemia factors have been isolated from a variety of natural materials which have been named vitamins $B_{12}$ and $B_{12b}$. Vitamin $B_{12}$ is also known as cyano-cobalamine and vitamin $B_{12b}$ as hydroxo-cobalmine. As $B_{12b}$ has been shown to be the full equivalent of $B_{12}$ against Addisonian pernicious anemia, for convenience, the fraction that is known to be effective in combating pernicious anemia will be designated by the term vitamin $B_{12}$ hereinafter and is intended to include $B_{12}$, $B_{12b}$ and other similar factors.

In addition to its presence in liver, vitamin $B_{12}$ is associated with the mycelia of Streptomyces griseus and Streptomyces fradiae when cultured on certain artificial media and is also known to be present in appreciable amounts elsewhere as, for example, in aureomycin fermentations, in such packing-house wastes as hog, cattle and chicken faeces, and in the stomach contents of slaughtered animals. The anti-pernicious factors present in these packing-house wastes are known and referred to as "animal protein factors." The process of the present invention is applicable to the concentration of vitamin $B_{12}$ containing fractions from all such sources.

Processes by which vitamin $B_{12}$ may be concentrated have been described heretofore in the art with particular respect to liver as the source of the material. The preparation of an aqueous solution of the anti-pernicious anemia factor or vitamin $B_{12}$ is a step common to many of the known methods for the concentration of the vitamin $B_{12}$ activity. Whether the solution in water is obtained by extraction of whole liver to give a crude starting preparation, or whether it is obtained by extraction with organic solvents and recovered from the solvents by extraction with water or by precipitation at various stages of a purification procedure involving other steps is of no consequence, it being necessary only that the vitamin $B_{12}$ be in aqueous solution. Such an aqueous solution or the paste or dry solids obtained by the partial or complete removal of water therefrom, serves as a starting point for conventional procedures for the preparation of liver or vitamin $B_{12}$ concentrates, as described for example, by Laland and Klem, Acta. Med. Scand. (1936) 88, 620; U. S. Pats. 2,134,256, 2,125,844, 2,324,848, and 2,369,465. Although these and other procedures have produced useful liver concentrates containing vitamin $B_{12}$ at a purity of about 0.2 microgram of vitamin $B_{12}$ activity per milligram of total solids, such products have not obtained widespread use in anemia therapy.

Vitamin $B_{12}$ has been obtained in much greater purity than this, but only after long and complicated purification procedures. Simpler methods by which the vitamin $B_{12}$ content of such preparations can be increased and the cost materially reduced are desirable. It is also desirable to have available a procedure by which vitamin $B_{12}$ present in dilute aqueous solution can be easily extracted and obtained in the form of a concentrated solution having a greatly reduced volume. Some of the known procedures produce a more concentrated product when applied to crude materials but are of little value when applied to the concentration of more highly purified vitamin $B_{12}$ containing materials. A procedure which is effective when applied to concentration or purification of more highly purified vitamin $B_{12}$ preparations, would also be useful. In order heretofore to produce highly purified vitamin $B_{12}$ preparations, it has been necessary to subject a crude preparation that has been highly concentrated to further action by mixed microorganisms as a means of removing impurities which hinder further purification, for example, as described in J. Biochem. Soc. (Proceedings) 40, iv (1946).

According to the method of this invention, the vitamin $B_{12}$ in a crude preparation can be freed from approximately 85 percent of the genetic impurities present in a 75 percent yield by partition between water and diethylacetic acid.

Crude vitamin $B_{12}$ concentrates suitable for treatment in accordance with the process of this invention can be obtained from liver by known means or from cultures of *Streptomyces griseus* or other sources, according to methods described and claimed in the copending applications of Curtis E. Meyer and William H. De Vries, Serial 78,458 now Patent 2,595,159, George C. Colovos, Serial 146,621, and William G. Jackson, Serials 146,625 now abandoned, 146,626 and 146,337 now Patent 2,613,171.

According to the copending application of Curtis E. Meyer and William H. De Vries, Serial 78,458, filed February 25, 1949, a suitable culture of *Streptomyces griseus* or a *Streptomyces fradiae* grown on an artificial medium is acidified and filtered. The filtrate is treated with activated carbon, the carbon removed and extracted with aqueous acetone adjusted to a pH between approximately 7 and approximately 8 with ammonium hydroxide. The ammonia, acetone and the bulk of the water are removed by evaporation; the vitamin $B_{12}$ containing product thus obtained can be purified further by the process of this invention.

The crude vitamin $B_{12}$ can be precipitated from the above solution by the addition of several (19 or thereabout) volumes of acetone and the precipitated solid thus obtained extracted with methyl alcohol, as described for the purification of vitamin $B_{12}$ preparations obtained from liver; the methyl alcohol can thereafter be replaced by water. This product may likewise be further purified by treatment in accordance with the process of this invention.

Alternatively, the product thus obtained can be further decolorized and purified by contact with a cation-exchange resin followed by contact with an anion-exchange resin, as more fully described and claimed in copending application, Serial 146,621, by George C. Colovos. This product may also be treated further in accordance with the method of this invention.

According to the copending application of William G. Jackson, Serial 146,625, aqueous concentrates of vitamin $B_{12}$ can be prepared from the culture of a $B_{12}$ containing microorganism by hydrolysing the cells with aqueous acid to liberate $B_{12}$ therefrom, adding a water-miscible organic solvent such as isopropanol, salting out the organic solvent with a salt of polyvalent acid and separating the vitamin $B_{12}$ containing organic matter. A partially purified vitamin $B_{12}$ thus obtained can be isolated by evaporation of the solvent or preferably by precipitation through the addition of a large volume of acetone. This product may likewise be further purified by treatment in accordance of the process of this invention.

Although the process of this invention can be used to purify the vitamin $B_{12}$ concentrates prepared by the methods previously described it is preferred to use a more highly purified concentrate of vitamin $B_{12}$ prepared as described by William G. Jackson in copending application Serial 146,337, wherein aqueous concentrates of crude vitamin $B_{12}$ are contacted with phenol and an ether to form a two phase ternary system. Most of the vitamin $B_{12}$ present can be recovered in a much more concentrated form by separating the organic layer, adding a further amount of an ether and a fresh quantity of phenol-water phase whereupon the solubility relationships are reversed and the vitamin $B_{12}$ appears in the aqueous phase in a form suitable for further purification.

The process of this invention comprises, as its first and essential step, intimately contacting an aqueous extract of vitamin $B_{12}$ and its genetic impurities with diethylacetic acid. The mixture is allowed to separate and the organic phase which contains a substantial proportion of the vitamin $B_{12}$ in a more purified state is withdrawn. The aqueous phase, which contains a smaller concentration of vitamin $B_{12}$, may be extracted with further quantities of diethylacetic acid until it is no longer profitable to do so. An optional step at this point comprises intimately contacting the separated organic fraction, containing purified vitamin $B_{12}$, with an additional quantity of water. This step, while it removes some of the vitamin $B_{12}$ and thus reduces the overall yield, removes a relatively large amount of impurities and leaves the vitamin $B_{12}$ remaining in the organic phase in a more highly purified condition. The organic extracts are then combined and shaken with water and approximately an equal volume of an inert, water-immiscible organic solvent whereupon the solubility relationships are reversed and the vitamin $B_{12}$ appears in the aqueous phase in a more highly purified condition. The aqueous extract can then be washed with a small amount of a relatively low boiling, inert, water-immiscible organic solvent and heated under reduced pressure to remove the last traces of organic solvent and diethylacetic acid. The aqueous solution thus obtained is suitable for clinical use or can be further purified by carbon chromatography as described in the copending application of William G. Jackson, Serial No. 146,626, and then crystallized to obtain pure vitamin $B_{12}$.

Among the inert, water-immiscible organic solvents suitable for use in the method of this invention are the aliphatic ethers such as diethyl ether and dibutyl ether, the aliphatic hydrocarbon solvents such as pentane, hexane, heptane, the alicyclic hydrocarbons such as cyclohexane and methylcyclohexane, and the aromatic hydrocarbon solvents such as benzene and toluene. In general a relatively low boiling solvent in which diethylacetic acid is soluble and vitamin $B_{12}$ is insoluble is satisfactory.

Although the preferred modification contemplates the use of equal volumes of aqueous phase and diethylacetic acid the ratios may be varied over a considerable range.

The following examples are illustrative of the method of this invention, but the invention is not restricted thereto.

*Example 1*

A mixture of 400 milliliters of an aqueous solution containing 28 grams of solids of which 510 milligrams was vitamin $B_{12b}$ and 400 milliliters of diethylacetic acid was intimately mixed, allowed to stand, the organic phase separated, and the aqueous phase extracted three additional times with equal volumes of diethylacetic acid. The aqueous phase, although dark red, contained only 79 milligrams of vitamin $B_{12b}$ and was discarded. Each of the four organic extracts was washed with 100 milliliter portion of water, which removed a total of 54 milligrams of vitamin $B_{12b}$.

The organic extracts were combined, added to a mixture of 200 milliliters of water and 1200 milliliters of mixed hexanes, thoroughly agitated, and allowed to stand. The layers were separated and the organic layer washed with an additional 100 milliliters of water. The aqueous extracts were combined, washed with a small portion of mixed hexanes to remove any remaining diethylacetic acid and heated under a reduced pressure to remove the last traces of organic solvent. The resulting aqueous solution (250 milliliters) contained 4.6 grams of solid of which 370 milligrams was vitamin $B_{12b}$, a recovery of 73 percent of the vitamin $B_{12b}$ originally present and a 5–6 fold purification.

Example 2

A solution of 70 milligrams of solid containing 1540 micrograms of vitamin $B_{12b}$ in one milliliter of water was extracted twice with 1 milliliter portions of diethylacetic acid. The organic extracts were combined and diluted with 5 milliliters of mixed hexanes to precipitate the vitamin $B_{12b}$. In this manner 16 milligrams of solids containing 1030 micrograms of vitamin $B_{12b}$ were obtained, 67 percent of the vitamin $B_{12b}$ originally present.

Example 3

A solution of 187 milligrams of solids containing 1030 micrograms of vitamin $B_{12b}$ in 2 milliliters of water was extracted with 2 milliliters of diethylacetic acid. The organic layer was diluted with 4 milliliters of dibutyl ether and filtered. The filter cake was washed with acetone to remove any solvent and then extracted with water. The resulting aqueous solution contained approximately 10 percent of the vitamin $B_{12b}$ originally present at a purity of 15 micrograms per milligram of solids.

Example 4

An aqueous solution containing 18 micrograms of vitamin $B_{12}$ per milliliter at a purity of 2 milligrams per gram of total solids was shaken with an equal volume of diethylacetic acid whereupon 40 percent of the vitamin $B_{12}$ present went into the organic phase.

Inasmuch as the foregoing specification comprises preferred embodiments of the invention, it is to be understood that the invention is not limited thereto and that variations and modifications can be made in a conventional manner by those skilled in the art without departing from the scope of this invention.

We claim:
1. A method for the purification of antipernicious anemia factors having vitamin $B_{12}$ activity obtained from biological sources comprising intimately mixing a water solution of said factors having vitamin $B_{12}$ activity and the genetic impurities associated therewith and diethyl acetic acid, allowing the intimate mixture to separate into its two component phases, removing the diethyl acetic acid phase and precipitating the purified material having vitamin $B_{12}$ activity from the diethyl acetic acid by the addition of an inert, water-immiscible organic solvent.

2. The method of claim 1 wherein the vitamin $B_{12}$ activity is derived from vitamin $B_{12}$.

3. The method of claim 1 wherein the vitamin $B_{12}$ activity is derived from hydroxocobalamine.

JARED H. FORD.
WILLIAM G. JACKSON.

References Cited in the file of this patent

UNITED STATES PATENTS

| Number | Name | Date |
|---|---|---|
| 2,530,416 | Wolf | Nov. 21, 1950 |

OTHER REFERENCES

Kaczka, Science, volume 112, September 29, 1950, pages 354, 355.

Jackson, Journal of the American Chemical Society, volume 73, pages 337 to 341 (January 1951).

Ellis, Journal of Pharmacy and Pharmacology (1949), volume I, pages 60, 61.

Merck Index, 5th edition (1940), page 195.

Pierce, Journal of the American Chemical Society, volume 71, (1949) page 2952.